(12) United States Patent
Kim et al.

(10) Patent No.: US 7,762,707 B2
(45) Date of Patent: Jul. 27, 2010

(54) BACKLIGHT UNIT

(75) Inventors: Won-nyun Kim, Seoul (KR); Ji-hwan Noh, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 0 days.

(21) Appl. No.: 11/242,011

(22) Filed: Oct. 4, 2005

(65) Prior Publication Data

US 2006/0072344 A1   Apr. 6, 2006

(30) Foreign Application Priority Data

Oct. 5, 2004   (KR) ................ 10-2004-0079134
Nov. 17, 2004  (KR) ................ 10-2004-0093881

(51) Int. Cl.
*F21V 7/04* (2006.01)

(52) U.S. Cl. .............. 362/632; 362/97.1; 362/373; 362/612; 362/633

(58) Field of Classification Search ........ 362/612, 362/97.1, 373, 632, 633
See application file for complete search history.

(56) References Cited

U.S. PATENT DOCUMENTS

| 6,275,211 B1* | 8/2001 | Flannery ............ 345/102 |
| 6,439,731 B1* | 8/2002 | Johnson et al. ....... 362/561 |
| 6,493,440 B2 | 12/2002 | Gromatzky et al. |
| 6,515,857 B2* | 2/2003 | Ford et al. .......... 361/687 |
| 6,825,828 B2* | 11/2004 | Burke et al. ......... 345/101 |
| 6,917,143 B2* | 7/2005 | Matsui et al. ........ 313/35 |
| 6,949,772 B2* | 9/2005 | Shimizu et al. ....... 362/652 |
| 2004/0169451 A1* | 9/2004 | Oishi et al. ......... 313/45 |
| 2006/0023448 A1* | 2/2006 | Mok et al. ........... 362/231 |

FOREIGN PATENT DOCUMENTS

| CN | 101044427 | 9/2007 |
| DE | 2004-9998 | 9/2004 |
| EP | 1785764 | 5/2007 |
| JP | 1-96898 | 4/1989 |
| JP | 8-136918 | 5/1996 |
| JP | 10-319379 | 12/1998 |
| JP | 11-259001 | 9/1999 |
| JP | 2000-30521 | 1/2000 |
| JP | 2002-311416 | 10/2002 |
| JP | 2003-331604 | 11/2003 |
| JP | 2004-279262 | 10/2004 |
| KR | 2004-57269 | 7/2004 |
| KR | 2005-108536 | 11/2005 |
| WO | 00/60406 | 10/2000 |
| WO | WO 2004/031844 | 4/2004 |

OTHER PUBLICATIONS http://wordnet.princeton.edu/perl/webwn?s=module.*
http://en.wiktionary.org/wiki/correspond.*
PCT Search Report dated Jan. 10, 2006 issued in PCT/KR2005/003214.
European Search Report dated Feb. 21, 2008 issued in EP 05792761.8.
Chinese Office Action dated May 23, 2008 issued in CN 2005-10137350.3.
European Examination Report issued Feb. 9, 2010 in EP Application No. 05792761.8.

* cited by examiner

*Primary Examiner*—Sandra L O'Shea
*Assistant Examiner*—William J Carter
(74) *Attorney, Agent, or Firm*—Stanzione & Kim, LLP

(57) ABSTRACT

A backlight unit having light sources to illuminate light to a display panel includes a support plate to support the light sources, a printed circuit board provided on a first region of the support plate, and a heat discharging member provided on a second region of the support plate to discharge heat generated from the light sources. The backlight unit has a slim external appearance and an excellent heat discharging efficiency.

24 Claims, 6 Drawing Sheets

BACKLIGHT UNIT

CROSS-REFERENCE TO RELATED APPLICATIONS

This application claims the benefit of Korean Patent Application No. 2004-93881, filed on Nov. 17, 2004, and Korean Patent Application No. 2004-79134, filed on Oct. 5, 2004, in the Korean Intellectual Property Office, the disclosure of which is incorporated herein by reference.

BACKGROUND OF THE INVENTION

1. Field of the Invention

The present general inventive concept relates to a backlight unit, and more particularly, to a backlight unit having an improved heat discharging efficiency.

2. Description of the Related Art

Generally, a conventional backlight unit supplies light from a back surface of a liquid crystal display (LCD) panel. The backlight unit includes a diffusion sheet to scatter and diffuse the light, a frame arranged on edges of the diffusion sheet, an LCD driving circuit board provided on a back surface of the frame, and a light emitting diode (LED) provided on the LCD driving circuit board as a light source.

In the conventional backlight unit, however, it is difficult to discharge heat generated from the LED. If the heat is not quickly discharged, the ambient temperature is increased to cause a problem to a neighboring system.

Accordingly, there is a need to improve a structure of the backlight unit to thereby allow the heat from the LED to be discharged efficiently. More desirably, the structure of the backlight unit needs to be improved so as to make the backlight unit slim in thickness.

SUMMARY OF THE INVENTION

The present general inventive concept provides a backlight unit having a slim external appearance and an excellent heat discharging efficiency.

Additional aspects and/or advantages of the present general inventive concept will be set forth in part in the description which follows and, in part, will be obvious from the description, or may be learned by practice of the present general inventive concept.

The foregoing and/or other aspects of the present general inventive concept may be achieved by providing a backlight unit having light sources to illuminate light to a display panel, the backlight unit comprising a support plate to support the light sources, a printed circuit board provided on a first region of the support plate, and a heat discharging member provided on a second region of the support plate to discharge heat generated from the light sources.

The light sources may comprise a plurality of LEDs disposed separately from one another in a plurality of rows on the support plate, and the heat discharging member may comprise a plurality of heat pipes provided relative to the support plate so as to maintain a uniform temperature of the plurality of LEDs disposed on the respective rows.

The heat discharging member may comprise a plurality of sub-discharging members disposed in a plurality of rows on the support plate so as to correspond to respective rows of the plurality of LEDs.

The backlight unit may further comprise at least one cooling fan provided in a rear side of the support plate to blow air toward the heat discharging member.

The foregoing and/or other aspects of the present general inventive concept may also be achieved by providing a backlight unit comprising at least one LED module including a multiplicity of LEDs to generate light and an LED board to support and drive the multiplicity of LEDs, at least one heat pipe provided so as to be contactable with the LED module to cool the LED module, a module support base to support the LED module and having a heat pipe support part to support the at least one heat pipe so as to allow the at least one heat pipe to contact the LED module, and a support plate provided on a back side of the module support base to support the module support base.

The backlight unit may comprise at least one heat discharging member provided on at least one region of the support plate to cool the heat discharged from the LED module.

The heat discharging member may be provided on both sides of the support plate to cross the at least one heat pipe in a lengthwise direction, or may be disposed in a first direction having an angle of the lengthwise direction of the at least one heat pipe. The angle may be a right angle.

The LED module and the heat pipe may be disposed in a plurality of rows on the support plate. The at least one heat pipe may comprises a pair of heat pipes to correspond to respective rows of the LED module, and the pair of heat pipes are disposed separately from each other in a lengthwise direction thereof.

The heat discharging member may comprise at least one cooling fan provided thereon.

The at least one cooling fan is provided in an upper region of the heat discharging member.

The heat discharging member may comprise at least one auxiliary heat pipe provided therein.

The auxiliary heat pipe may be provided along a lengthwise direction of each heat discharging member.

The heat discharging member may comprise an auxiliary heat pipe support part provided therein to support the auxiliary heat pipe and to allow the auxiliary heat pipe to contact the support plate.

The backlight unit may comprise a printed circuit board provided on the support plate so as to be disposed between the pair of heat discharging members.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
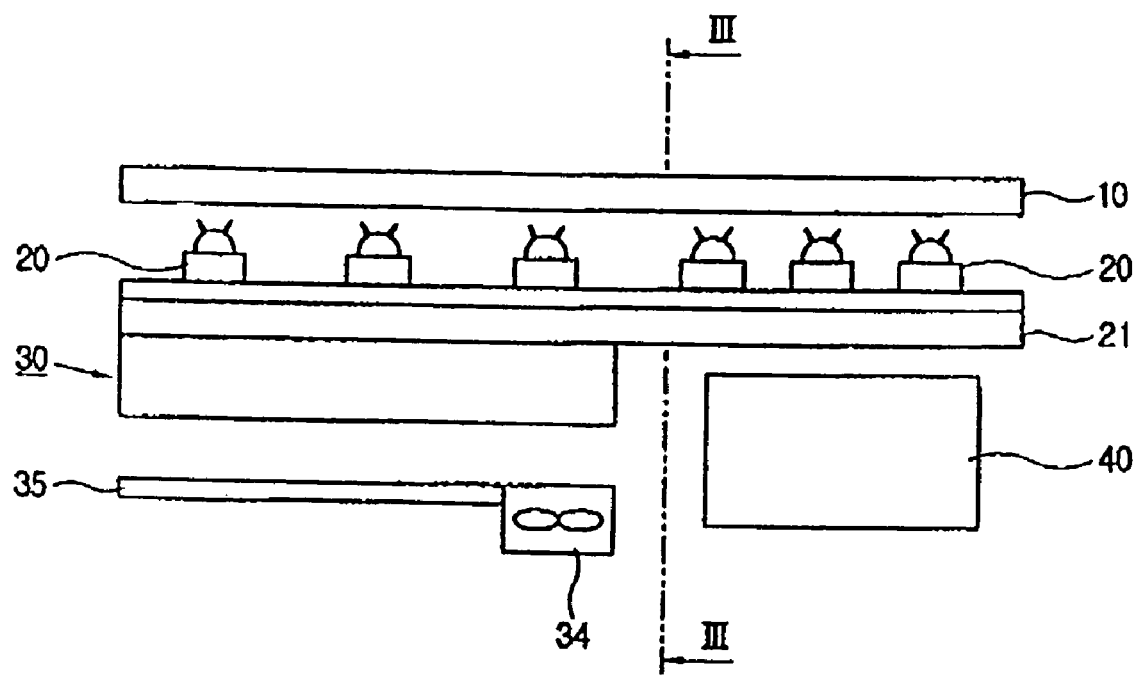
FIG. 1 is a side sectional view schematically illustrating a backlight unit according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 3:
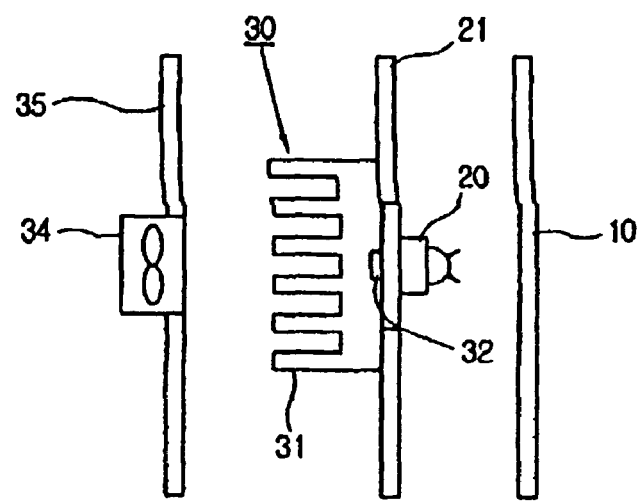
FIG. 3 is a sectional view taken along a line III-III of FIG. 1.

Referring to FIGS. 1 and 3, a backlight unit 1 according to an embodiment of the present general inventive concept comprises a light source provided in a rear side of a display panel 10 to illuminate light to thereby allow a picture to be displayed on the display panel 10, a support plate 21 to support the light source, a printed circuit board (PCB) 40 to drive the light source and the like, and a heat discharging device to discharge heat generated from the light source.

The light source includes but is not limited to a multiplicity of light emitting diodes (LEDs) 20 electrically connected to the PCB 40, thereby emitting light when power is supplied. That is, the light source may include various kinds of lamps which can emit the light.

The multiplicity of LEDs 20 are arranged in a plurality of rows on the support plate 21. Each LED 20 emits light having one of colors, such as red (R), green (G) and blue (B). However, each LED 20 may emit light having another color, e.g., white. The multiplicity of LEDs 20 generate heat at a high temperature while generating the light.

The support plate 21 supports the multiplicity of LEDs 20 so that they are arranged separately from one another and arranged in the plurality of rows.

The PCB 40 is provided on a first region of the support plate 21, thereby driving the LEDs 20. That is, the PCB 40 is provided on a back side of the support plate 21, thereby being capable of controlling light emission of the LEDs 20 and an intensity of the light emitted therefrom.

The heat discharging device comprises a heat discharging member 30 provided on the back side of the support plate 21. The heat discharging device may further comprise a heat pipe 32 through which the heat from the LEDs 20 is discharged, and further comprise a cooling fan 34 disposed in a rear side of the heat discharging member 30. The cooling fan 34 may be disposed opposite to a corresponding one of the LEDs 20 with respect to the heat discharging member 30.

The heat discharging member 30 may include a heat sink having a plurality of heat discharging fins 31 disposed separately at regular intervals. The heat discharging member 30 is provided in plural to correspond to respective rows of the multiplicity of LEDs 20. The heat discharging member 30 is provided on a second region of the support plate 21 other than the first region on which the PCB 40 is provided, and also provided on the back side of the support plate 21. Accordingly, the heat discharging member 30 can quickly discharge the heat generated from the LEDs 20 by extending an area contacting air through the heat discharging fins 31. The heat discharging member 30 is made of at least one of materials having high thermal conductivity.

The cooling fan 34 is coupled to the heat discharging member 30 by a fan support unit 35 disposed in the rear side of the heat discharging member 30. The cooling fan 34 ventilates the air toward the heat discharging member 30 and cools the heat transmitted to the heat discharging member 30 from the LEDs 20. In other words, the cooling fan 34 cools the heat discharging member 30 by compulsive convection so as to quickly discharge the heat generated from the LEDs 20. The cooling fan 34 is provided in plural to correspond to the plurality of heat discharging members 30. That is, the cooling fans 34 correspond to the respective rows in which the LEDs 20 and the heat discharging member 30 are disposed.

The heat pipe 32 a pipe of a hollow shape. A working fluid is inserted in an inside of the heat pipe 32 and then the heat pipe 32 is sealed. The heat pipe 32 is provided in an elongated form on a back side of each LED 20 and in plural corresponding to the respective rows of the LEDs 20. That is, each heat pipe 32 is elongated so as to cool the LEDs 20 provided on the first region of the support plate 21 in which the heat discharging member 30 is disposed and/or a third region of the support plate 21 in which the heat discharging member 30 is not disposed. Accordingly, each heat pipe 32 is connected to the heat discharging member 30 to cool the multiplicity of LEDs 20 disposed on the respective rows at almost uniform temperature.

With this configuration shown in FIGS. 1 through 2, a heat discharging operation of the backlight unit 1 will be described below.

At first, the multiplicity of LEDs 20 are turned on, thereby generating heat. Then, the heat generated in each of the LEDs 20 is transmitted to the heat discharging member 30 provided in the back side of the LEDs 20, and then the transmitted heat is discharged through the heat discharging member 30. At this time, the LEDs 20 disposed on each row can be cooled by the heat pipe 32 at almost uniform temperature, and the heat discharging member 30 can be quickly cooled by the cooling fan 34.

In the backlight unit 1 according to this embodiment of the present general inventive concept, the printed circuit board (PCB) 40 is provided on the second region on which the heat discharging member is not disposed, thereby making an overall external appearance of the backlight unit 1 slim.

Further the backlight unit 1 according to this embodiment of the present general inventive concept is provided with the heat discharging member 30 and the cooling fan 34 to quickly discharge the heat generated from the LEDs. In addition, by providing the heat pipe 32, all of the multiplicity of LEDs 20 disposed on each row can be maintained at uniform temperature.

In the backlight unit 1 according to this embodiment of the present general inventive concept, a number of LEDs, for example, six LEDs 20, may constitute a row (refer to FIG. 1), and the row is provided in plural. On each of the rows may be provided a temperature sensor (not shown) to sense a temperature, and a control unit (not shown) to control an air velocity of the cooling fan 34, disposed on each row, according to the sensed temperature of the temperature sensor, so as to maintain the uniform temperature in each row.

Referring to FIGS. 4 to 7, a backlight unit 100 according to another embodiment of the present general inventive concept comprises at least one LED module 120 to generate light, at least one heat pipe 128 provided so as to be in contact with the LEDS module 120 to thereby cool the LED module 120, a module support base 125 to support the LED module 120 to thereby support the heat pipe 128 and to allow the heat pipe 128 to be in close contact with the LED module 120, and a support plate 110 provided on a back side of the module support base 125 to support the module support base 125. The backlight unit 100 according to this embodiment of the present general inventive concept may further comprise an optical sheet 160 provided in front of the LED module 120, and a reflection sheet 150 provided between the optical sheet 160 and the LED module 120, thereby reflecting the light reflected from the optical sheet 160 back to the optical sheet 160.

Figure 4:
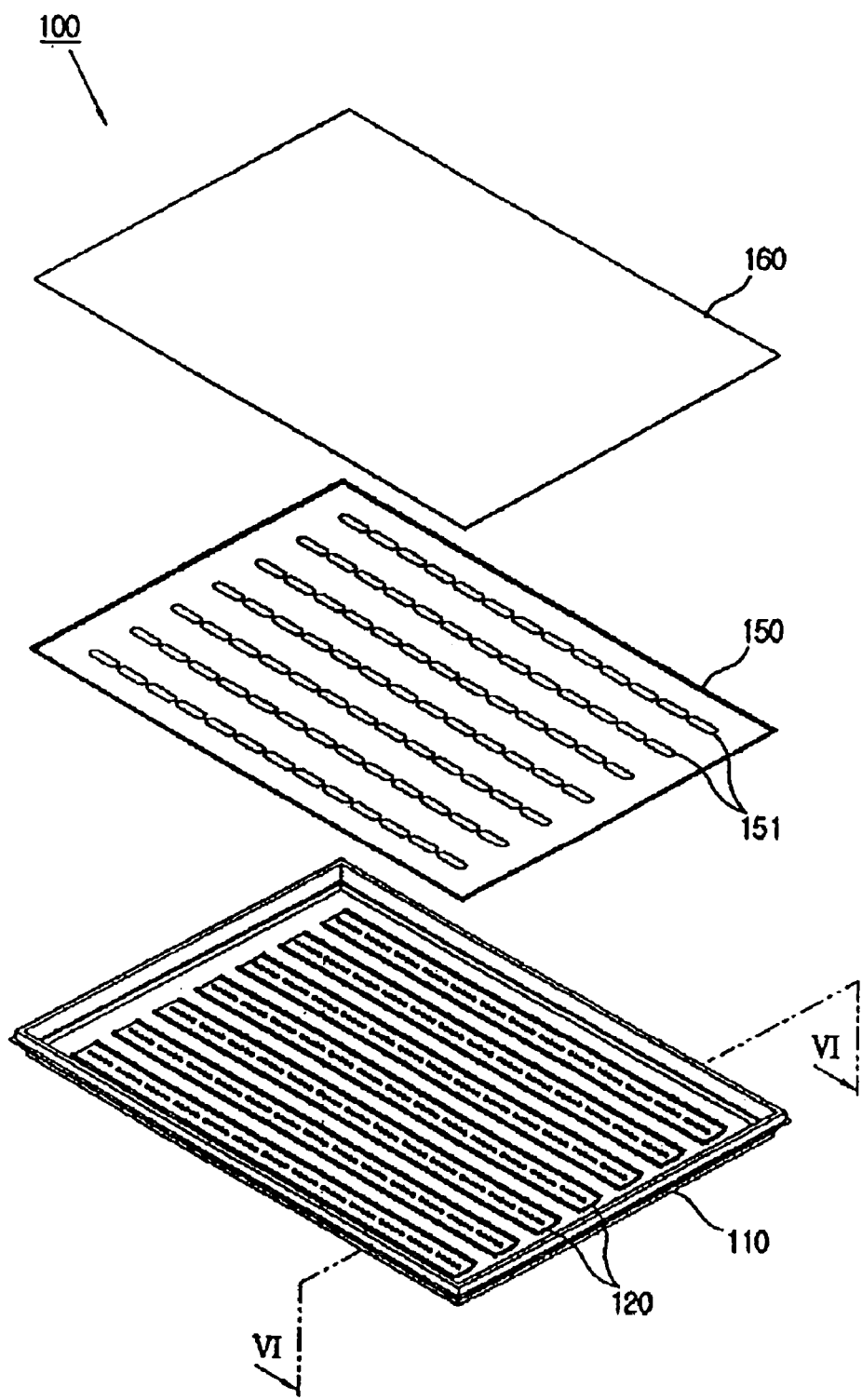
FIG. 4 is an exploded perspective view illustrating a backlight unit according to another embodiment of the present general inventive concept.
Figure 5:
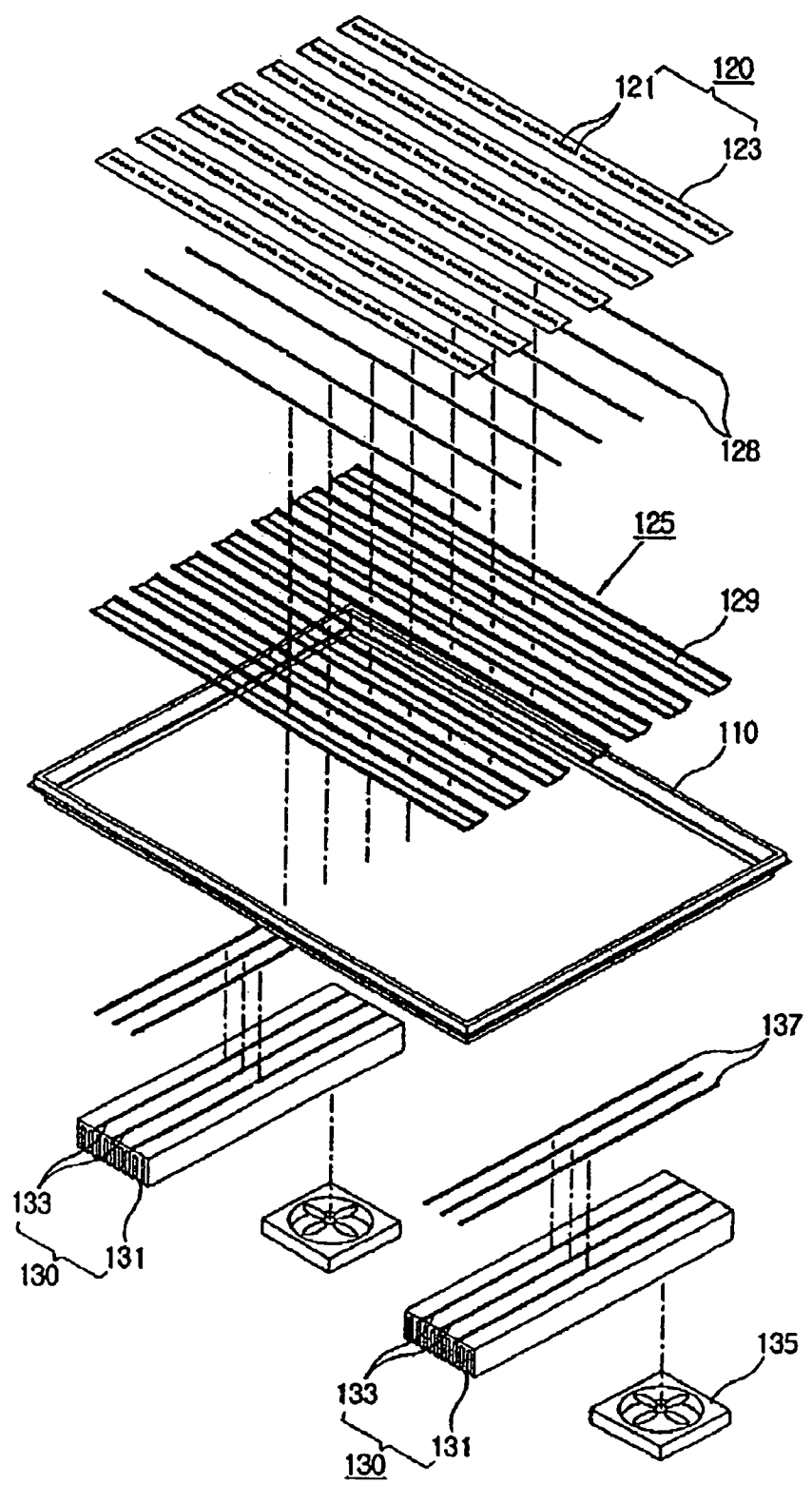
FIG. 5 is an exploded perspective view illustrating a part of the backlight unit of FIG. 4.
Figure 6:
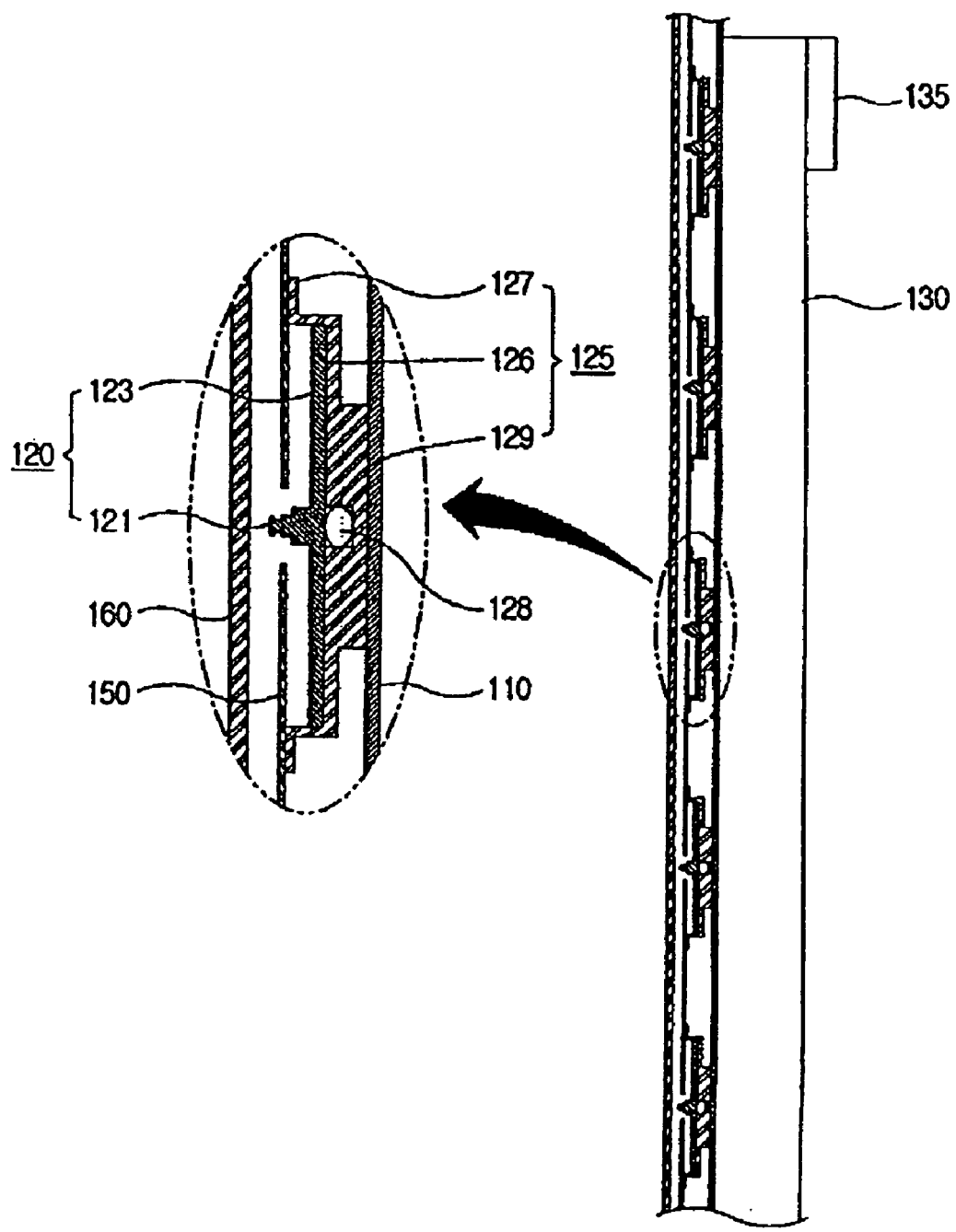
FIG. 6 is a sectional view taken along a line VI-VI of FIG. 4.
Figure 7:
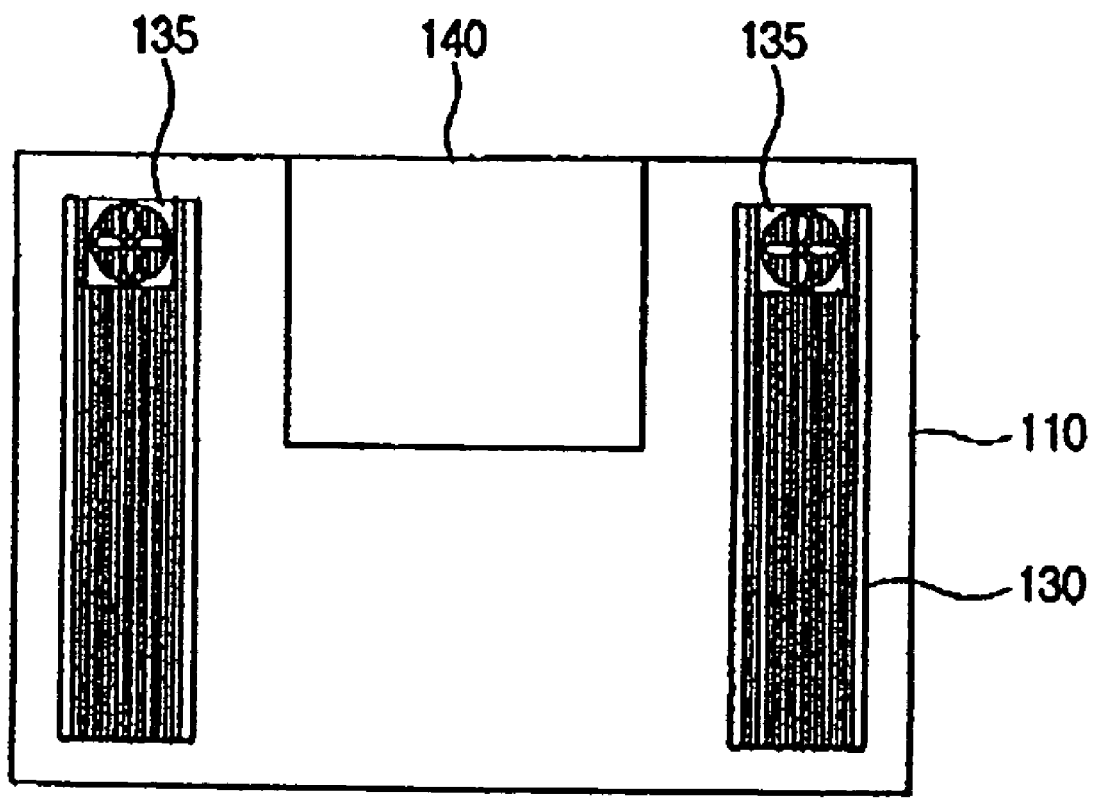
FIG. 7 is a rear view illustrating the backlight unit of FIG. 4.

The LED module 120 is provided in plural, and the LED modules 120 are disposed in a plurality of rows disposed parallel to the support plate 110. That is, when the number of the rows is seven, the LED modules 120 are disposed in corresponding ones of the seven rows which are disposed parallel to the support plate 110 as illustrated in FIG. 4. Each of the LED modules 120 comprises a multiplicity of LEDs 121 each generating light, and an LED board 123 to drive and support the multiplicity of LEDs 121.

The multiplicity of LEDs 121 generate heat of a high temperature while generating light. Each LED 121 is similar to that of the embodiment of FIGS. 1 through 3. Thus, detail description thereof will be omitted.

The LED board 123 may be an elongated plate so as to be coupled to and support the multiplicity of LEDs 121. On the surface of the LED board 123 is formed a circuit pattern (not shown) to drive the LEDs 121. The LEDs 121 are separately disposed on the LED board 123. By way of example, intervals between five LEDs 121 will be more widened than seven LEDs 121. The LED board 123 is made of aluminum having good thermal conductivity, by way of example. However, the material of the LED board 123 is not limited to aluminum and it may be formed with other materials as far as they are good in thermal conductivity.

The optical sheet 160 includes a diffusion sheet to uniformly scatter and diffuse the light generated from the LEDs 121, and a prism sheet disposed separately from and in front of the diffusion sheet, thereby aligning a traveling path of the light having passed the diffusion sheet and so on. The diffusion sheet reflects a part of the light generated directly from the LEDs 121 to the LED module 120, and the light reflected by the diffusion sheet is reflected back to the diffusion sheet by the reflection sheet 150.

On the reflection sheet 150 is provided a plurality of penetrating parts 151 to receive the LEDs 121 therein. The reflection sheet 150 is made of an aluminum board coated with a reflection film so that the light reflected from the optical sheet 160 can be reflected back to the optical sheet 160. However, the reflection sheet 150 is not limited to the aluminum material but can be provided with other materials. The reflection sheet 150 can be a single unit like the optical sheet 160 to cover an entire area of the LED module 120. However, the reflection sheet 150 may be provided in several units to cover the entire area of the LED module 120.

The module support base 125 comprises a module receiving part 126 to receive and support each LED module 120, and a heat pipe support part 129 to receive and support the heat pipe 128 so that the heat pipe 128 can be in close contact with the LED module 120. The module support base 125 comprises a reflection sheet support part 127 to contact a bottom side of the reflection sheet 150 to thereby support the reflection sheet 150. The module support base 125 is provided in plural corresponding to each LED module 120. In other words, seven (7) module support base 125 may be provided corresponding to the LED modules 120 disposed on seven rows, by way of example. The module support base 125 is provided with a material good in thermal conductivity so as to easily discharge the heat generated from the LED module 120. The module support base 125 is formed with aluminum good in thermal conductivity by way of example, but may be formed with other materials.

The reflection sheet support part 127 is extended from the bottom face of the reflection sheet 150 and both ends of the module receiving part 126, in parallel with the reflection sheet 150.

The heat pipe support part 129 is depressed on a top of the module receiving part 126 so as to receive the heat pipe 128 therein. The heat pipe support part 129 is formed in an elongated manner along a lengthwise direction of the module receiving part 126.

The heat pipe 128 is provided in plural to be received in each heat pipe support part 129 and closely contact the back side of the LED module 120. The heat pipe 128 may be provided in a pair, corresponding to each row of the LED module 120, and the pair of the heat pipes 128 are separately disposed in a lengthwise manner. That is, a multiplicity of heat pipes 128 are disposed elongatedly in a horizontal direction of the support plate 110 to correspond to each LED module 120. The heat pipe 128 is similar to that of the embodiment described in FIGS. 1 through 3. Thus, detail description thereof will be omitted.

The support plate 110 is provided on a bottom side of the module support base 125 to thereby support the module support base 125. The support plate 110 is provided with a material good in thermal conductivity so as to easily discharge the heat generated in the LED module 120. The support plate 110 is formed with aluminum good in thermal conductivity by way of example, but may be formed with other materials. The support plate 110 may be formed with a shape of a quadrilateral board, and is in close contact with the module support base 125 by coupling. On at least one region of the support plate 110 is provided at least one heat discharging member 130.

The heat discharging member 130 is provided on the back side of the support plate 110. The heat discharging member 130 is provided on both sides of the support plate 110 so that it can cross the heat pipe 128 in a lengthwise direction. In other words, the heat discharging member 130 is elongated in a direction perpendicular to the lengthwise direction of the heat pipe 128 so that it can cross the heat pipes 128 disposed parallel to the support plate 110 (refer to FIG. 7). The heat discharging member 130 may be disposed in a first direction having an angle with the lengthwise direction of the at least one heat pipe 128. However, the heat discharging member 130 may be provided on one side of or in a center of the support plate 110 so that it can cross the heat pipe 128 in the lengthwise direction. Accordingly, when the heat discharging member 130 is provided on the one side of the support plate 110, the heat discharging member 130 can cool the heat pipes 128 disposed on each row of the heat pipe support part 129 since the one side of the support plate 110 is disposed in a first portion between the pair of the heat pipes 128. When the heat discharging member 130 is provided on the other side of the support plate 110, the heat discharging member 130 can cool the heat pipes 128 disposed on each row of the heat pipe support part 129 since the other side of the support plate 110 is disposed in a second portion opposite to the first portion between the pair of the heat pipes 128.

The heat discharging member 130 is formed with a material good in thermal conductivity so as to easily discharge the heat generated in the LED module 120. The heat discharging member 130 is formed with aluminum good in thermal conductivity by way of example, but may be formed with other materials. The heat discharging member 130 comprises a multiplicity of heat discharging fins 131 provided so as to extend an area contacting with air, and an auxiliary heat pipe support part 133 provided so as to receive therein and support an auxiliary heat pipe 137 to be in a surface contact with the support plate 110. On the heat discharging member 130 may be provided at least one cooling fan 135. At least one auxiliary heat pipe 137 may be provided on the heat discharging member 130. On the support plate 110 between a pair of heat discharging members 130 may be provided a printed circuit board (PCB) 140 to drive the LED modules 120 and so on (refer to FIG. 7).

The auxiliary heat pipe support part 133 is depressed in a lengthwise direction so as to receive therein and support the auxiliary heat pipe 137 in front of the heat discharging member 130 contacting the support plate 110. By way of example, three auxiliary heat pipe support parts 133 may be provided separately from one another on each discharging member 130, but one, two, four or more auxiliary heat pipe support parts 133 may be provided.

The cooling fan 135 is provided on each heat discharging member 130, thereby cooling the heat discharging member 130. The cooling fan 135 is coupled to the heat discharging fins 131 of the heat discharging member 130 using screws and the like so as to allow air to blow toward the heat discharging fins 131, thereby forming an air circulation around the heat discharging member 130 and cooling the heat discharging member 130 using a compulsive convection mechanism. The cooling fan 135 is provided on an upper region of each heat discharging member 130 (refer to FIG. 7). That is, the cooling fan 135 is provided in the upper region of each heat discharging member 130 so as to correspond to an upper region of the auxiliary heat pipe 137, thereby cooling the upper region of the auxiliary heat pipe 137.

The auxiliary heat pipe 137 is provided in a lengthwise direction on each heat discharging member 130. The auxiliary heat pipe 137 is provided between the support plate 110 and the heat discharging member 130 to be in contact with the support plate 110. The auxiliary heat pipe 137 is provided in plural so as to correspond to the auxiliary heat pipe support parts 133 of the heat discharging member 130. The auxiliary heat pipe 137 has a similar construction to the heat pipe 128. Thus, detail description thereof will be omitted. According to this, if the upper region of the heat discharging member 130 is cooled by the cooling fan 135, entire portions of the heat discharging member 130 can be cooled down to maintain an almost uniform temperature using the auxiliary heat pipe 137 disposed in the lengthwise direction of the heat discharging member 130.

Figure 2:
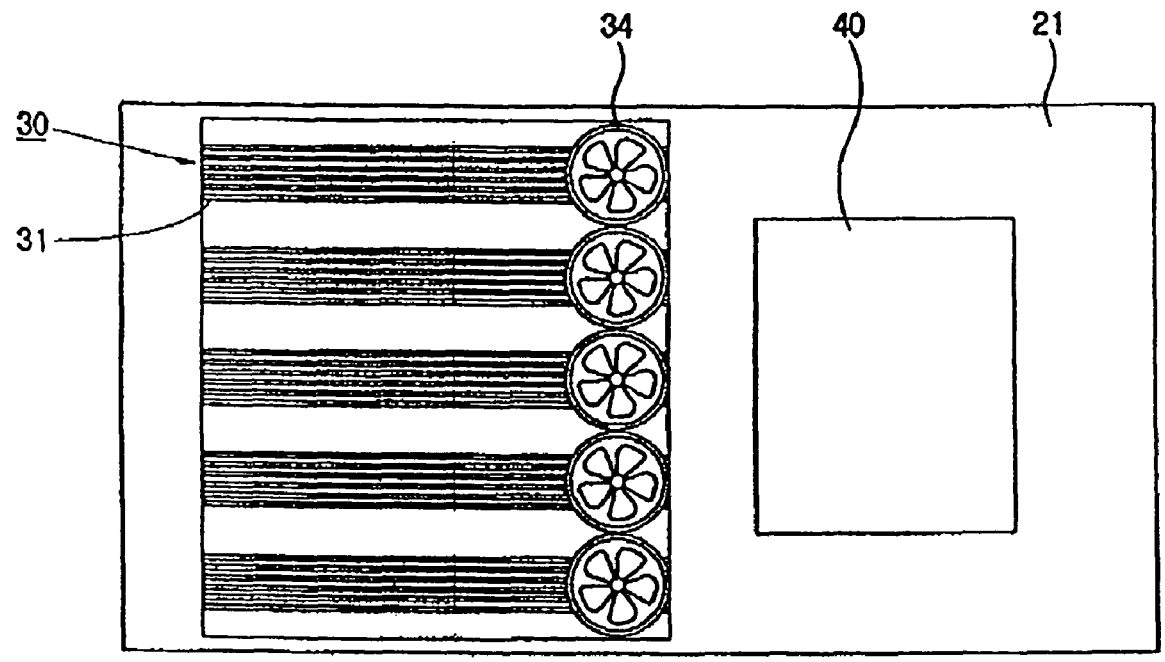
FIG. 2 is a rear view illustrating the backlight unit of FIG. 1.

The printed circuit board 140 is similar to that of the embodiment as described in FIGS. 1 through 3. Thus, detail description thereof will be omitted.

A heat discharging process of the backlight unit 100 according to this embodiment of the present general inventive concept will be described.

When power is supplied to the multiplicity of LED modules 120, the LEDs 121 emit light, thereby generating heat. The heat generated in the LEDs 121 is transmitted to the LED board 123, the heat pipe 128 and the support plate 110, and then discharged by the heat discharging member 130 mounted on the back side of the support plate 110. At this time, the heat discharging members 130, provided on both sides of the support plate 110, cool both sides of the support plate 110 using the cooling fan 135, and the LED module 120 can be uniformly cooled by the heat pipe 128 provided horizontally in an elongated manner from both sides of the support plate 110. Accordingly, since the heat discharging member 130 can be almost uniformly cooled by the cooling fan 135 provided on the upper region of the heat discharging member 130 and the auxiliary heat pipe 137, both sides of the support plate 110 can be cooled.

In the backlight unit 100 according to this embodiment of the present general inventive concept, the LED module can be cooled quickly and easily by the heat pipe 128 provided in a contactable manner with the LED module 120.

The LED module 120 may be cooled more quickly and easily by further providing the auxiliary heat pipe 137 in the heat discharging member 130.

In addition, a thickness of the backlight unit 100 can be reduced, thereby making its external appearance slim, by providing the printing circuit board 140 on the support plate 110 between a pair of heat discharging members 130.

In the backlight unit 100 according to the present invention, the LED module 120, the module support base 125, the support plate 110 and the heat discharging member 130 may be coupled in a various manner using screws or adhesive agents and so on.

As described above, according to the present invention there is provided a backlight unit whose external appearance becomes slim. This backlight unit can also discharge effectively heat generated from light sources.

Although the present general inventive concept has been described in connection with exemplary embodiments illustrated in the accompanying drawings, it should be understood that the present general inventive concept is not limited thereto and those skilled in the art can make various modifications and changes without departing from the scope of the general inventive concept.

What is claimed is:

1. A backlight unit having a light source to illuminate light to a display panel, comprising:
    a support plate provided in back of the display panel to support the light source;
    a printed circuit board provided on a first region of the support plate and opposite to the display panel with respect to the support plate to drive the light source;
    a heat discharging member provided on a second region of the support plate and opposite to the display panel with respect to the support plate to discharge heat generated from the light source,
    wherein the light source comprises a plurality of LEDs disposed separately from one another in a plurality of rows on the support plate, and
    wherein the heat discharging member comprises a plurality of heat discharging members disposed on the support plate to correspond to the length of the respective rows of the LEDs; and
    a plurality of heat pipes provided relative to the support plate to maintain the plurality of LEDs disposed on each row in a uniform temperature and having a hollow shape to insert and seal a working fluid therein,
    wherein each of the plurality of the heat pipes comprises a first end disposed close to the printed circuit board and a second end disposed away from the printed circuit board.

2. The backlight unit as claimed in claim 1, further comprising:
    at least one cooling fan disposed adjacent to the first end of the plurality of the heat pipes.

3. The backlight unit as claimed in claim 1, further comprising:
    at least one cooling fan disposed on a portion of the second region close to the first region to blow air toward the heat discharging member.

4. The backlight unit as claimed in claim 1, wherein the heat discharging member comprises first and second heat discharging members disposed parallel to each other in the second region.

5. The backlight unit as claimed in claim 1, wherein the second region comprises at least two sub-regions disposed opposite to each other with respect to the first region, and the heat discharging member comprises first and second heat discharging members disposed in the two sub-regions.

6. The backlight unit as claimed in claim 1, wherein the heat discharging member comprises a heat pipe to contact the light source and a heat discharging pin to contact the heat pipe so that the heat generated from the light source is discharged through the heat pipe and the heat discharging pin.

7. The backlight unit as claimed in claim 1, wherein the light source comprises a first portion to generate the light toward a display panel and a second portion disposed opposite to the first end, and the heat discharging member comprises a heat discharging pin and a heat pipe disposed between the heat discharging pin and the second portion of the light source to contact the second portion of the light source.

8. The backlight unit as claimed in claim 1, wherein the heat discharging member comprises a heat discharging pin coupled to the support plate, and a heat pipe disposed between the heat discharging pin and the light source to transmit the heat from the light source to the heat discharging pin.

9. The backlight unit as claimed in claim 8, wherein the support plate comprises a heat pipe support plate disposed between the support plate and the heat pipe to support the heat pipe and to transmit the heat from the heat pipe to the heat discharging pin.

10. The backlight unit as claimed in claim 1, wherein the first and second regions are located along a length of the support plate and do not overlap each other.

11. The backlight unit as claimed in claim 1, wherein the first and second regions are located along a length of the support plate and are separated from each other by a predetermined distance in a lengthwise direction with respect to the support plate.

12. A backlight unit to illuminate light to a display panel, comprising:
    at least one LED module including a multiplicity of LEDs disposed in a direction to generate light toward the display panel, and an LED board to support and drive the multiplicity of LEDs;
    at least one heat pipe provided in the LED board to be in contact with the at least one LED module in a lengthwise direction with respect to the LED module to cool the at least one LED module and having a hollow shape to insert and seal a working fluid therein;
    a module support base to support the at least one LED module, and having a heat pipe support part disposed in the lengthwise direction to support the at least one heat pipe so as to allow the at least one heat pipe to contact the length of at least one LED module; and
    a support plate provided on a back side of the module support base to support the module support base;
    a printed circuit board disposed in a first region of the support plate corresponding to in part each of the at least one LED module and opposite to the display panel with respect to the support plate to control the at least one LED module; and
    a heat discharging member disposed in a second region of the support plate other than the first region and opposite to the display panel with respect to the support plate to cool the heat discharged from the at least one LED module.

13. The backlight unit as claimed in claim 12, wherein the at least one heat discharging member comprises a plurality of heat discharging members disposed on both sides of the support plate to cross the at least one heat pipe in a lengthwise direction.

14. The backlight unit as claimed in claim 13, wherein the at least one LED module and the at least one heat pipe comprise a plurality of LED modules and a plurality of heat pipes, respectively, disposed in a plurality of rows on the support plate, and the plurality of heat pipes are disposed separately from each other in the lengthwise direction to correspond to respective rows of the plurality of the LED modules.

15. The backlight unit as claimed in claim 12, wherein the at least one heat discharging member comprises at least one cooling fan provided thereon.

16. The backlight unit as claimed in claim 15, wherein the at least one cooling fan is provided in an upper region of the at least one heat discharging member.

17. The backlight unit as claimed in claim 12, further comprising:
    at least one auxiliary heat pipe provided in the at least one heat discharging member.

18. The backlight unit as claimed in claimed 17, wherein the at least one auxiliary heat pipe is provided along a lengthwise direction of the at least one heat discharging member.

19. The backlight unit as claimed in claim 18, wherein the at least one heat discharging member comprises an auxiliary heat pipe support part provided therein to support the at least one auxiliary heat pipe so as to allow the at least one auxiliary heat pipe to contact the support plate.

20. The backlight unit as claimed in claim 12, wherein the at least one heat discharging member is disposed in a first direction to discharge heat transmitted from the at least one LED module to the at least one heat pipe, and
    the at least one LED module is disposed in a second direction having an angle with the first direction.

21. The backlight unit as claimed in claim 12,
    wherein the at least one LED module and the at least one heat pipe are disposed in a first region of the support plate, and the at least one heat discharging member is disposed in a second region of the support plate.

22. A backlight unit to illuminate light to a display panel, comprising:
    at least one light source to generate light;
    at least one heat pipe provided to be in contact with the at least one light source and having a hollow shape to insert and seal a working fluid therein;
    a support plate to support the at least one light source and the at least one heat pipe so that the heat generated from the at least one light source is discharged through the at least one heat pipe;
    at least one heat discharging member to discharge heat transmitted from the at least one light source to the at least one heat pipe; and
    a printed circuit board to control the at least one light source,
    wherein the printed circuit board is disposed in a first region of the support plate and opposite to the at least one light source with respect to the support plate, the at least one heat discharging member is disposed in a second region of the support plate and opposite to the at least one light source with respect to the support plate to correspond to the length of the at least one light source, and the at least one light source and the at least one heat pipe are disposed in the first and second regions of the support plate.

23. The backlight unit as claimed in claim 22, wherein the at least one light source comprises a multiplicity of LEDs to generate the light, and an LED board to support and drive the multiplicity of LEDs.

24. The backlight unit as claimed in claim 23, further comprising:
    a module support base to support the at least one LED module, and having a heat pipe support part to support the at least one heat pipe so as to allow the at least one heat pipe to contact the at least one LED module,
    wherein the support plate supports the module support base.

* * * * *